(12) United States Patent
Lin et al.

(10) Patent No.: US 9,356,527 B2
(45) Date of Patent: May 31, 2016

(54) MULTI-MODE ACTIVE CLAMPING POWER CONVERTER

(71) Applicant: LITE-ON TECHNOLOGY CORPORATION, Taipei (TW)

(72) Inventors: Chien Yu Lin, Taipei (TW); Wei-Lieh Lai, New Taipei (TW); Yu-Kang Lo, Taipei (TW); Huang-Jen Chiu, New Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 90 days.

(21) Appl. No.: 14/484,217

(22) Filed: Sep. 11, 2014

(65) Prior Publication Data

US 2015/0326133 A1  Nov. 12, 2015

(30) Foreign Application Priority Data

May 7, 2014  (CN) .......................... 2014 1 0190694

(51) Int. Cl.
*H02M 3/335* (2006.01)

(52) U.S. Cl.
CPC ...... *H02M 3/33569* (2013.01); *H02M 3/33507* (2013.01); *H02M 3/33546* (2013.01); *H02M 3/33592* (2013.01)

(58) Field of Classification Search
CPC ............ H02M 3/33569; H02M 3/335; H02M 3/33546; H02M 3/33592
USPC ....................................................... 363/21.02
See application file for complete search history.

(56) References Cited

U.S. PATENT DOCUMENTS

| | | | | |
|---|---|---|---|---|
| 2012/0063175 | A1* | 3/2012 | Wang | H02M 3/33592 363/21.14 |
| 2013/0063981 | A1* | 3/2013 | Dujic | H02M 1/4233 363/16 |
| 2014/0169041 | A1* | 6/2014 | Jen | H02M 3/33507 363/21.04 |

\* cited by examiner

*Primary Examiner* — Jessica Han
*Assistant Examiner* — Demetries A Gibson
(74) *Attorney, Agent, or Firm* — Li & Cai Intellectual Property (USA) Office

(57) ABSTRACT

A multi-mode active clamping power converter comprises an input inductor, a down-bridge switch, an up-bridge switch, a first energy-storing capacitor, a clamping capacitor, a resonant inductor, a magnetizing inductor, a transformer, an output diode and an output capacitor. The input inductor has a boundary inductance value, wherein an input voltage source is operated between a first voltage and a second voltage and the boundary inductance value is set according to the first voltage and a heavy load so as to be served as an initial condition of the multi-mode active clamping power converter, and then the input inductor is operated in a boundary conduction mode.

10 Claims, 2 Drawing Sheets

MULTI-MODE ACTIVE CLAMPING POWER CONVERTER

BACKGROUND

1. Technical Field

The present disclosure is related to power converter, and in particular to, a multi-mode active clamping power converter.

2. Description of Related Art

With the advancement of technology and the rapid development of portable electronic products, more and more attention has been paid to the performance of switching converters and several of their applications. In recent years, due to the major advances in power electronic technology and the development of nanotechnology, and the growing tendency of electronic devices towards slim and light, energy saving, and cost reducing, the internal power converter design should also trend towards slim and light, energy saving, and design cost reducing. The power supply is generally required for every electric appliance, to convert an input power source from a battery or AC main supply into an output power source with specific rating of the electric appliance. As technology advances, it becomes a routine for power supplies to operate more efficiently or have higher conversion efficiency. As known in the art, the conversion efficiency of a power supply is the ratio of the output power from the output power source to the input power from the input power source.

A power conversion system receives an input DC or AC power and converts the input DC or AC power to a/an DC or AC output power, and the DC or AC output power usually has a voltage different from that of the input power. Control of the output power may respond to the output voltage or the output current. A boost converter (also known as step-up converter) is a power converter which has the output voltage greater than the input voltage. The boost converter is a switched mode power including at least a first electrically controlled switch (for example a transistor), at least a first energy-storing element (for example an electric coil) and an auxiliary element (for example a diode or a second electrically controlled switch). Generally, the first electrically controlled switch and the diode are placed between the electric coil and the output end of the boost converter, wherein the current alternately charges the electric coil, in response to turning-off operation of the first electrically controlled switch, and the current is transmitted to a load, in response to turning-on operation of the first electrically controlled switch. When the current is transmitted to the load, the current is flowing through the diode or the second electrically controlled switch. A buck converter (also known as step-down converter) is a power converter which has the input voltage greater than the output voltage. The buck converter is a switched mode power including at least a third electrically controlled switch (for example a transistor), at least a second energy-storing element (for example an electric coil) and an auxiliary element (for example a diode or a fourth electrically controlled switch). Generally, the third electrically controlled switch and the diode are placed between the input power source and the electric coil, wherein the current alternately charges the electric coil, in response to turning-off operation of the third electrically controlled switch, and the electric coil continuously releases energy to the load, in response to turning-on operation of the third electrically controlled switch. When the electric coil releases energy to the load, the diode or the fourth electrically controlled switch is connected to the electric coil in series. A flyback converter is a power converter which has the output voltage greater or less than the input voltage. The flyback converter is a switched mode power including at least an electrically controlled switch, an energy-storing element, and at least an auxiliary element (for example a diode and/or an additional electrically controlled switch). The energy-storing element includes at least an electric coil (especially a transformer), whereby a voltage ratio can increase with an additional advantage of isolation. Generally, a primary winding of the transformer is connected between the electrically controlled switch and the input power source, and a secondary winding of the transformer is connected between the auxiliary element and the output end of the flyback converter. The power converters listed above is for the explanation of some topologies, and the power converters are not limited thereto.

In the low-power applications, the flyback converter is a widely used power circuit, but the flyback converter has the disadvantages as follows. The input current pulse is suffering from electromagnetic interference, and leakage inductance causes the voltage spike. Furthermore, it is difficult for the traditional active clamping single-ended primary inductor converter to perform zero-voltage switching in the whole load range, and thus it is hard to improve the efficiency greatly.

SUMMARY

An embodiment of the instant disclosure provides a multi-mode active clamping power converter. The multi-mode active clamping power converter includes an input inductor, a down-bridge switch, an up-bridge switch, a first energy-storing capacitor, a clamping capacitor, a resonant inductor, a magnetizing inductor, a transformer, an output diode and an output capacitor. A first end of the input inductor is connected to the positive terminal of an input voltage source, wherein the input voltage source is operated between a first voltage and a second voltage. A control end of the down-bridge switch receives a first control signal, and a first end thereof of the down-bridge switch is connected to the negative terminal of the input voltage source. A control end of the up-bridge switch receives a second control signal, and a first end of the up-bridge switch is connected to a second end of the down-bridge switch. A first end of the first energy-storing capacitor is connected to the first end of the down-bridge switch. A first end of the clamping capacitor is connected to the second end of the up-bridge switch, and a second end of the clamping capacitor is connected to a second end of the first energy-storing capacitor. A first end of the resonant inductor is connected to the second end of the down-bridge switch. A first end of the magnetizing inductor is connected to a second end of the resonant inductor, and a second end of the magnetizing inductor is connected to the second end of the clamping capacitor. The transformer has a primary winding and a secondary winding, and the primary winding is connected with the magnetizing inductor in parallel, wherein the primary winding and the secondary winding have mutual inductance effect. An anode of the output diode is connected to a first end of the secondary winding. A first end of the output capacitor is connected to a cathode of the output diode, and a second end of the output capacitor is connected to a second end of the secondary winding. The input inductor having a boundary inductance value and the boundary inductance value is set according to the first voltage and a heavy load so as to be served as an initial condition of the multi-mode active clamping power converter. When the down-bridge switch is turned on, an input inductor current is used to charge the input inductor, and a first switch current flowing through the down-bridge switch is equal to the sum of the input inductor current and a magnetizing inductor current, in order to perform a zero-voltage switching. The input inductor operates in a boundary conduction mode and the multi-mode active clamping power converter is able to perform the zero-voltage switching when the input voltage source is operated at the first voltage.

In an embodiment of the instant disclosure, when the input voltage source is operated at a voltage greater than the first voltage, the input inductor is operated in a discontinuous conduction mode and generates a phenomenon of a negative current, to make a body diode of the down-bridge switch turned on easily, such that the multi-mode active clamping power converter is able to perform the zero-voltage switching.

In an embodiment of the instant disclosure, the multi-mode active clamping power converter performs the zero-voltage switching to improve power conversion efficiency since the input inductor is operated in the boundary conduction mode or the discontinuous conduction mode.

In an embodiment of the instant disclosure, when the down-bridge switch is turned off and the input inductor current is zero, the magnetizing inductor current charges a parasitic capacitor of the down-bridge switch.

In an embodiment of the instant disclosure, when the voltage across the first and second end of the down-bridge switch is zero, the magnetizing inductor current flows through a body diode of the down-bridge switch, such that the voltage of first energy-storing capacitor increases linearly with the increase of the magnetizing inductor current.

In an embodiment of the instant disclosure, when the down-bridge switch is turned off, the input inductor current and the magnetizing inductor current charge the parasitic capacitor of the down-bridge switch.

In an embodiment of the instant disclosure, when a body diode of the up-bridge switch is turned on, a conduction current charges the clamping capacitor, wherein the conduction current is the sum of the input inductor current and the magnetizing inductor current.

In an embodiment of the instant disclosure, when the up-bridge switch is turned on, the first switch current dropped to zero slowly to facilitate the accomplishment of the zero-voltage switching.

In an embodiment of the instant disclosure, the capacitor voltage of the clamping capacitor makes the output diode connected to the secondary winding of the multi-mode active clamping power converter conduct forward, while the output voltage of the secondary winding goes back to the primary winding through the induction of the transformer.

In an embodiment of the instant disclosure, the first voltage is 90 volts, and the second voltage is 264 volts.

To sum up, in the multi-mode active clamping power converter provided by the embodiment of the instant disclosure, the boundary inductance value of the input inductor is set according to the boundary condition, such that the input inductor is operated in the multiple modes to make the multi-mode active clamping power converter perform zero-voltage switching in the whole load range. Therefore, the power conversion efficiency of the multi-mode active clamping power converter can be improved.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Figure 1:
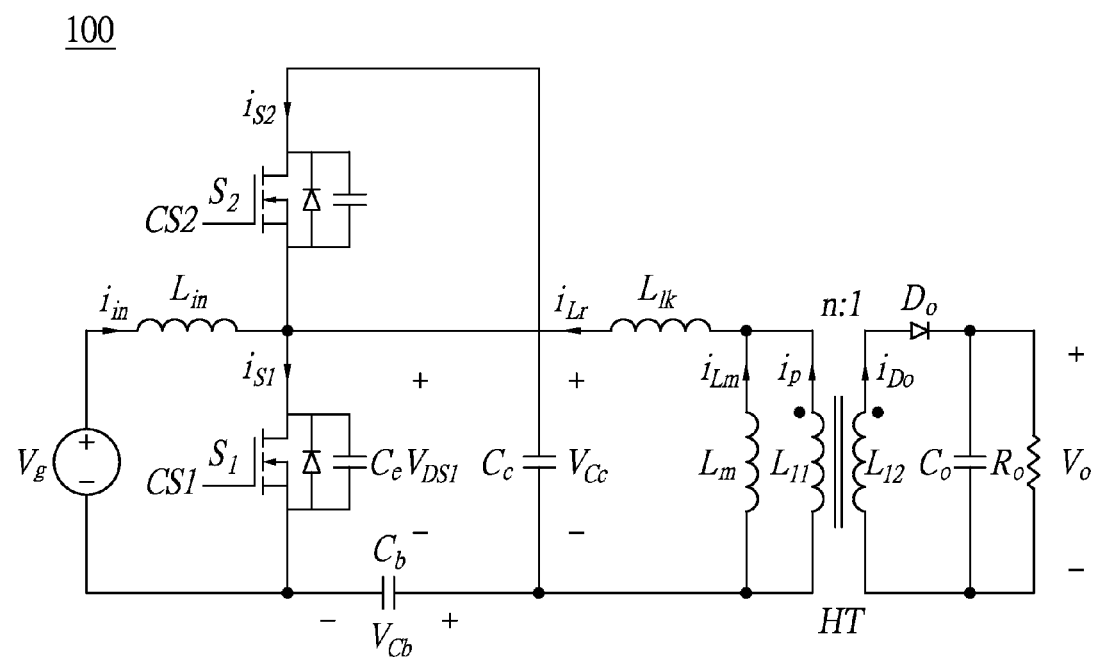
FIG. 1 is a schematic circuit diagram of a multi-mode active clamping power converter according to an embodiment of the instant disclosure.

Example embodiments will be described below in more detail with reference to the accompanying drawings. Many different forms and embodiments are possible without deviating from the spirit and teachings of this disclosure and so the disclosure should not be construed as limited to the embodiments set forth herein. Rather, these embodiments are provided so that this disclosure will be thorough and complete, and will fully convey the scope of the disclosure to those skilled in the art. In the drawings, the sizes and relative sizes of layers and regions may be exaggerated for clarity. Like reference numbers refer to like elements throughout.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below and could be termed a second element, component, region, layer or section without departing from the teachings of the present disclosure. As used herein, the term "and/or" includes any and all combinations of one or more of the associated listed items.

The following instruction is used to describe a multi-mode active clamping power converter via a plurality of embodiments with corresponding drawings. However, the embodiments below are not for restricting the scope of the instant disclosure.

[Embodiment of Multi-Mode Active Clamping Power Converter]

The embodiment of the instant disclosure provides a multi-mode active clamping power converter which has an input inductor being able to operate in the discontinuous conduction mode or the boundary conduction mode, and that is a single-ended primary industry converter, such that the switch connected to the primary winding of the multi-mode active clamping power converter has the effect of zero-voltage switching. Thereby, the power efficiency of a mobile device (such as a notebook) can be increased and the volume of the mobile device can be dramatically reduced through operation in high frequency. The zero-voltage switching is defined as follows: when the voltage across the switch is zero or close to zero, the state of the switch changes from the off state to the conduction state. Please refer to FIG. 1. FIG. 1 is a schematic circuit diagram of a multi-mode active clamping power converter according to an embodiment of the instant disclosure. As shown in FIG. 1, the input inductor $i_{in}$ is able to be operated in the boundary conduction mode or the discontinuous conduction mode to make the multi-mode active clamping power converter 100 perform zero-voltage switching in the whole load range, such that power conversion efficiency of the multi-mode active clamping power converter 100 can be improved.

The multi-mode active clamping power converter 100 includes an input inductor $L_{in}$, a down-bridge switch S1, an up-bridge switch S2, a first energy-storing capacitor $C_b$, a clamping capacitor $C_c$, a resonant inductor $L_{lk}$, a magnetizing inductor $L_m$, a transformer, an output diode $D_o$ and an output capacitor $C_o$, wherein the multi-mode active clamping power converter 100 is connected to a load $R_o$ and outputs an output voltage $V_o$. A first end of the input inductor $L_{in}$ is connected to the positive terminal of an input voltage source $V_g$, wherein the input voltage source $V_g$ operates between a first voltage and a second voltage. A control end of the down-bridge switch S1 receives a first control signal CS1, and a first end of the down-bridge switch S1 is connected to the negative terminal of the input voltage source $V_g$. A control end of the up-bridge switch S2 is received to a second control signal CS2, and a first end of the up-bridge switch S2 is connected to a second end of the down-bridge switch S1. A first end of the first energy-storing capacitor $C_b$ is connected to the first end of the down-bridge switch S1. A first end of the clamping capacitor $C_c$ is connected to the second end of the up-bridge switch S2, and a second end of the clamping capacitor $C_c$ is connected to the second end of the first energy-storing capacitor $C_b$. A first end of the resonant inductor $L_{lk}$ is connected to the second end of the down-bridge switch S1. A first end of the magnetizing inductor $L_m$ is connected to a second end of the resonant inductor $L_{lk}$, and a second end of the magnetizing inductor $L_m$ is connected to the second end of the clamping capacitor $C_c$. The transformer having a primary winding L11 and a secondary winding L12, and the primary winding L11 is connected with the magnetizing inductor $L_m$ in parallel, wherein the primary winding L11 and the secondary winding L12 have mutual inductance effect.

An anode of the output diode Do is connected to a first end of the secondary winding L12 (with a dot). A first end of the output capacitor $C_o$ is connected to a cathode of the output diode $D_o$, and a second end of the output capacitor $C_o$ is connected to a second end of the secondary winding L12. It is worth mentioning that, the input inductor $L_{in}$ has a boundary inductance value (BIV), and the boundary inductance value is set according to the first voltage and a heavy load (boundary condition) so as to be served as an initial condition of the multi-mode active clamping power converter 100. When the down-bridge switch S1 is turned on, an input inductor current $i_{in}$ is used to charge the input inductor $L_{in}$, and a first switch current $i_{S1}$ flowing through the down-bridge switch S1 is equal to the sum of the input inductor current $i_{in}$ and a magnetizing inductor current $i_{Lm}$, so as to perform a zero-voltage switching (ZVS). When the input voltage source $V_g$ is operated at the first voltage, the input inductor $L_{in}$ operates at the boundary conduction mode (BCM) and the multi-mode active clamping power converter is able to perform the zero-voltage switching. When the input voltage source $V_g$ is operated at a voltage greater than the first voltage, the input inductor current $i_{in}$ is operated at a discontinuous conduction mode and generates a phenomenon of a negative current, to make a body diode of the down-bridge switch S1 turned on easily, such that the multi-mode active clamping power converter is able to perform the zero-voltage switching.

To put it concretely, in the embodiment, the first voltage is 90 volts and the second voltage is 264 volts. The input inductor $L_{in}$ of the boundary inductor value is set according to 90 volts and a heavy load (namely full load $R_o$) so as to be served as an initial condition of the multi-mode active clamping power converter 100, such that the waveform valley of the sine wave associated with the input inductor current $i_{in}$ approaches the zero current level. Therefore, the input inductor $L_{in}$ operates in the boundary conduction mode to make the down-bridge switch S1 be able to perform the zero-voltage switching. Furthermore, when the input voltage source $V_g$ is operated between 90 volts to 264 volts, the sine waveform of the input inductor current $i_{in}$ will drop and generate the phenomenon of a negative current, to make the input inductor $L_{in}$ operate in the discontinuous conduction mode and the body diode of the down-bridge switch S1 conduct easily, wherein the input inductor current $i_{in}$ can charge the input inductor $L_{in}$. In addition, when the down-bridge switch S1 starts to be turned on, the first switch current $i_{S1}$ of the down-bridge switch S1 flowing through the down-bridge switch S1 is a sum of the input inductor current $i_{in}$ and the magnetizing inductor current $i_{Lm}$, such that the down-bridge switch S1 is able to perform the zero-voltage switching.

In the following description is further instruction teaching a work mechanism of the multi-mode active clamping power converter 100.

Figure 2:
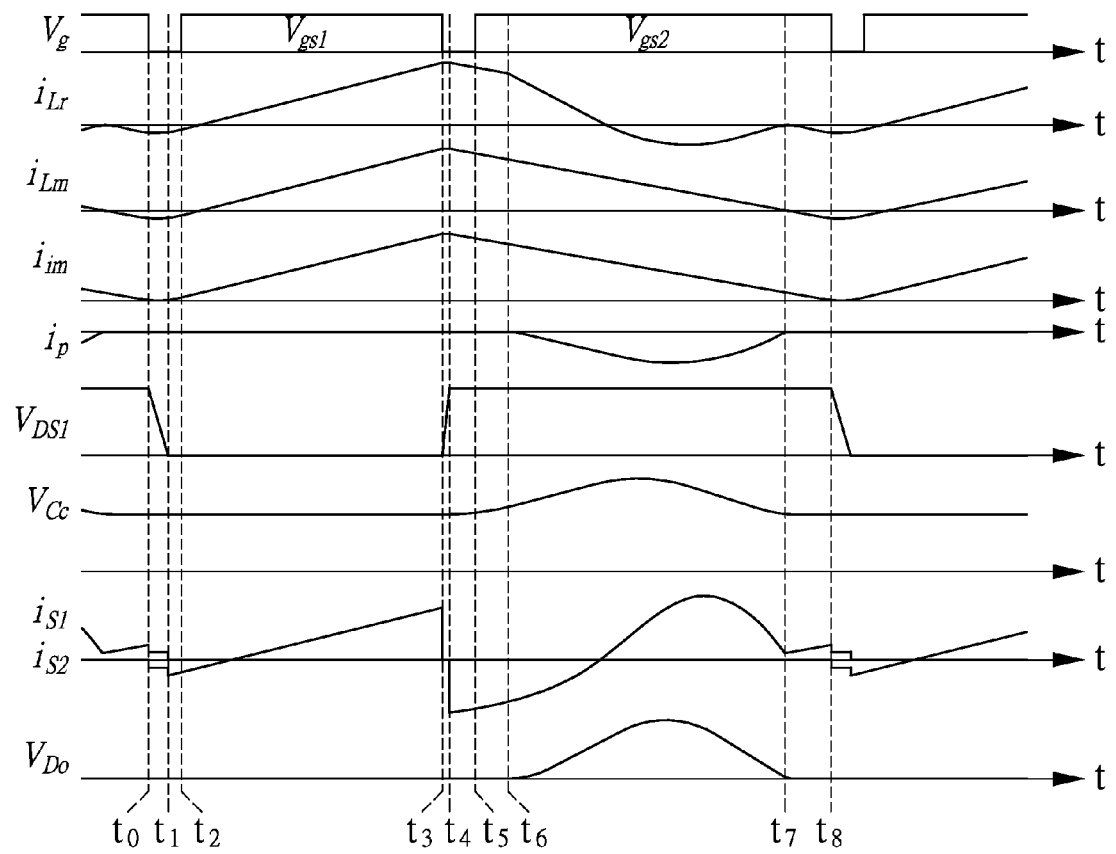
FIG. 2 shows a schematic waveform diagram of signals associated with the multi-mode active clamping power converter according to an embodiment of the instant disclosure.

Please refer to FIGS. 1 and 2. In the time interval $t_0$ to $t_1$ (the input voltage source $V_g$ is zero), when the up-bridge switch S2 of the multi-mode active clamping power converter 100 is turned off and the current value of the input inductor current $i_{in}$ is zero, the magnetizing inductor current $i_{Lm}$ charges the parasitic capacitor $C_c$ of the down-bridge switch S1. In the time interval $t_1$ to $t_2$ (the input voltage source $V_g$ is zero), the voltage $V_{DS1}$ across the first and second end of the down-bridge switch S1 of the multi-mode active clamping power converter 100 is zero, the magnetizing inductor current $i_{Lm}$ flows through the body diode of the down-bridge switch S1, such that the capacitor voltage $V_{Cb}$ of first energy-storing capacitor $C_b$ increases linearly with the increase of the magnetizing inductor current $i_{Lm}$. In the time interval $t_2$ to $t_3$ (the input voltage source $V_g$ is equal to the voltage $V_{gs1}$), the down-bridge switch S1 starts to be turned by the zero-voltage switching (ZVS), such that the input inductor current $i_{in}$ starts to charge the input inductor $L_{in}$, and the first switch current $i_{S1}$ flowing through the down-bridge switch S1 is equal to the sum of the input inductor current $i_{in}$ and the magnetizing inductor current $i_{Lm}$. In the time interval $t_3$ to $t_4$ (the input voltage source $V_g$ is zero), when the down-bridge switch S1 of the multi-mode active clamping power converter 100 is turned off, the input inductor current $i_{in}$ and the magnetizing inductor current $i_{Lm}$ charge the parasitic capacitor $C_c$ of the down-bridge switch S1.

In the time interval $t_4$ to $t_5$ (the input voltage source $V_g$ is zero), when the body diode of the up-bridge switch S2 of the multi-mode active clamping power converter 100 is turned on, the conduction current charges the clamping capacitor $C_c$, wherein the conduction current is the sum of the input inductor current $i_{in}$ and the magnetizing inductor current $i_{Lm}$. In the time interval $t_5$ to $t_6$ (the input voltage source $V_g$ is zero), when the up-bridge switch S2 of the multi-mode active clamping power converter 100 is turned on, the first switch current $i_{S1}$ slowly dropped to zero to facilitate accomplishment of the zero-voltage switching. In the time interval $t_6$ to $t_7$ (the input voltage source $V_g$ is equal to the voltage $V_{gs2}$), the capacitor voltage $V_{Cc}$ of the clamping capacitor $C_c$ is enough to make the output diode $D_o$ connected to the secondary winding L12 in the multi-mode active clamping power converter 100 conduct forward. While the output voltage $V_o$ at the secondary winding L12 goes back to the primary winding L11 due to the induction of the transformer with the n-multiple factor (the winding ratio of the primary winding L11 and the secondary winding L12 is n:1), wherein n is a positive integer. In the time interval $t_7$ to $t_8$ (the input voltage source $V_g$ is zero), the resonant inductor current $i_{Lr}$ is less than the magnetizing inductor current $i_{Lm}$, and hence the output diode $D_o$ connected to the secondary winding L12 is turned off by the zero-current switching.

Possible Effect of Embodiment

To sum up, in the multi-mode active clamping power converter provided by the embodiment of the instant disclosure, the boundary inductance value of the input inductor is set according to the boundary condition, and then the input inductor is operated in the multiple modes to make the multi-mode active clamping power converter perform zero-voltage switching in the whole load range, such that the power conversion efficiency of the multi-mode active clamping power converter can be improved.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A multi-mode active clamping power converter, comprising:
    an input inductor, a first end thereof is connected to a positive terminal of an input voltage source, wherein the input voltage source is operated between a first voltage and a second voltage;
    a down-bridge switch, a control end thereof receives a first control signal, and a first end thereof is connected to a negative terminal of the input voltage source;
    an up-bridge switch, a control end thereof receives a second control signal, and a first end thereof is connected to a second end of the down-bridge switch;
    a first energy-storing capacitor, a first end thereof is connected to the first end of the down-bridge switch;
    a clamping capacitor, a first end thereof is connected to the second end of the up-bridge switch, and a second end thereof is connected to a second end of the first energy-storing capacitor;
    a resonant inductor, a first end thereof is connected to a second end of the down-bridge switch;
    a magnetizing inductor, a first end thereof connected to a second end of the resonant inductor, and a second end thereof is connected to the second end of the clamping capacitor;
    a transformer, having a primary winding and a secondary winding, and the primary winding is connected with to the magnetizing inductor in parallel, wherein the primary winding and the secondary winding have mutual inductance effect;
    an output diode, an anode thereof is connected to a first end of the secondary winding; and
    an output capacitor, a first end thereof is connected to a cathode of the output diode, and a second end thereof is connected to a second end of the secondary winding,
    wherein the input inductor having a boundary inductance value and the boundary inductance value is set according to the first voltage and a heavy load so as to be served as an initial condition of the multi-mode active clamping power converter, when the down-bridge switch is turned on, an input inductor current is used to charge the input inductor, and a first switch current flowing through the down-bridge switch is equal to the sum of the input inductor current and a magnetizing inductor current, so as to implement a zero-voltage switching,
    wherein when the input voltage source is operated at the first voltage, the input inductor operates in a boundary conduction mode and the multi-mode active clamping power converter is able to perform the zero-voltage switching.

2. The multi-mode active clamping power converter according to claim 1, wherein when the input voltage source is operated in a voltage greater than the first voltage, the input inductor is operated in a discontinuous conduction mode and generates a phenomenon of a negative current, to make a body diode of the down-bridge switch turned on easily, such that the multi-mode active clamping power converter is able to perform the zero-voltage switching.

3. The multi-mode active clamping power converter according to claim 1, wherein the multi-mode active clamping power converter performs the zero-voltage switching to improve power conversion efficiency since the input inductor is operated in the boundary conduction mode or the discontinuous conduction mode.

4. The multi-mode active clamping power converter according to claim 1, wherein when the up-bridge switch is turned off and the current value of the input inductor current is zero, the magnetizing inductor current charges a parasitic capacitor of the down-bridge switch.

5. The multi-mode active clamping power converter according to claim 1, wherein when the voltage across the first and second end of the down-bridge switch is zero, the magnetizing inductor current flows through a body diode of the down-bridge switch, such that the voltage of first energy-storing capacitor increases linearly with the increase of the magnetizing inductor current.

6. The multi-mode active clamping power converter according to claim 1, wherein when the down-bridge switch is turned off, the input inductor current and the magnetizing inductor current charge a parasitic capacitor of the down-bridge switch.

7. The multi-mode active clamping power converter according to claim 1, wherein when a body diode of the up-bridge switch is turned on, a conduction current charges the clamping capacitor, wherein the conduction current is the sum of the input inductor current and the magnetizing inductor current.

8. The multi-mode active clamping power converter according to claim 1, wherein when the up-bridge switch is turned on, the first switch current drops to zero slowly to facilitate accomplishment of the zero-voltage switching.

9. The multi-mode active clamping power converter according to claim 1, a capacitor voltage of the clamping capacitor making the output diode connected to the secondary winding of the multi-mode active clamping power converter conduct forward, while the output voltage of the secondary winding goes back to the primary winding through induction of the transformer.

10. The multi-mode active clamping power converter according to claim 1, wherein the first voltage is 90 volts and the second voltage is 264 volts.

* * * * *